United States Patent
Rebhan

Patent Number: 5,135,553
Date of Patent: Aug. 4, 1992

[54] PRODUCTION OF $CO_2$ PELLETS

[75] Inventor: Dieter Rebhan, Geretsried-Gelting, Fed. Rep. of Germany

[73] Assignee: Linde Aktiengesellschaft, Wiesbaden, Fed. Rep. of Germany

[21] Appl. No.: 543,877

[22] Filed: Jun. 27, 1990

[30] Foreign Application Priority Data

Jun. 27, 1989 [DE] Fed. Rep. of Germany ....... 3921054

[51] Int. Cl.$^5$ .............................................. B29C 43/00
[52] U.S. Cl. .......................................... 62/35; 62/461
[58] Field of Search ................ 62/10, 35, 46.1

[56] References Cited

U.S. PATENT DOCUMENTS

| | | | |
|---|---|---|---|
| 2,016,815 | 10/1935 | Gilmore | 62/35 |
| 3,124,442 | 3/1964 | Rich | 62/35 |
| 3,393,152 | 7/1968 | Smith et al. | 62/46.1 |
| 3,443,389 | 5/1969 | Townsend et al. | 62/35 |
| 3,817,045 | 6/1974 | Muska | 62/35 |
| 4,597,266 | 7/1986 | Entrekin | 62/46.1 |

FOREIGN PATENT DOCUMENTS

A-805535 11/1936 France .

OTHER PUBLICATIONS

Chemical Abstracts, Band 92, Nr.12, 24. Mar. 1980, Seite 118, Zusammenfassung Nr. 96303z, . . . JP-A-79 112 795 (Japan Oxygen Co., Ltd.).

Primary Examiner—Ronald C. Capossela
Attorney, Agent, or Firm—Millen, White & Zelano

[57] ABSTRACT

During the production of solid $CO_2$ pellets by compressing $CO_2$ snow, in order to reduce the sublimation of the $CO_2$ snow in the compressing step, the $CO_2$ snow is subcooled with a cryomedium, e.g., argon or nitrogen. The compression mold may be separately cooled and the $CO_2$ snow may be subcooled with liquid cryomedium while in a storage vessel and/or sprayed with liquid cryomedium while on a conveyor leading to the press.

14 Claims, 2 Drawing Sheets

PRODUCTION OF CO₂ PELLETS

BACKGROUND OF THE INVENTION

The invention relates to the production of $CO_2$ pellets by compressing carbon dioxide snow into a hard solid state, and optionally reducing the hard solid to the desired particle size.

A great number of uses for $CO_2$ pellets are known, for example, as blasting media for deburring and paint removal, as a conveniently handleable refrigerant, etc. The production of solid, hard carbon dioxide takes place by compressing carbon dioxide snow. But in compressing this snow, for example, by compression rollers or rams, considerable losses of carbon dioxide snow occur, since, as is known, carbon dioxide assumes the gaseous state at ambient temperature (20°-25° C.) and atmospheric pressure; consequently, high losses of $CO_2$ snow occur by sublimation under these conditions. The net result is these processes suffer a reduction in the yield of the desired product, namely the solid $CO_2$ pellets, which is, of course, disadvantageous and undesirable. For a more detailed description of conventional systems to produce $CO_2$ snow or crystals and $CO_2$ pellets, attention is invited to WO 86/03707 = PCT/US85/02466.

SUMMARY OF THE INVENTION

An object of the invention therefore is to provide a process to economically increase the yield of $CO_2$ pellets.

Another object is to provide an apparatus for such a process.

Still another object is to provide compositions relating to the process.

Upon further study of the specification and appended claims, further objects and advantages of this invention will become apparent to those skilled in the art.

In general, the process object of the invention is achieved by a process which comprises subcooling the carbon dioxide snow with a cryomedium prior to the compression of the snow.

Supercooling the carbon dioxide snow, i.e., reducing the temperature thereof to temperatures below the sublimation temperature (−78.5° C.) of the $CO_2$, preferably to below about −83° C., more preferably to between −83° C. and to −108° C., results in a substantially smaller amount of the carbon dioxide changing into the gaseous state before, especially during and after the compression process. Supercooling to even lower temperatures is possible but generally is of no apparent advantage. Such temperatures can advantageously be produced and maintained with cryomedia, i.e., media having normal boiling points below −180° C., for example, liquid air nitrogen or liquid argon.

In a particularly advantageous embodiment, the carbon dioxide snow is subcooled with the cryomedium by direct heat exchange prior to the compression step. This can be done, for example, by spraying the cryomedium onto the snow or immersing in the cryomedium. If immersion is employed, cooling coils, for example, can be used for cooling the bath of the cryomedium. Thus, carbon dioxide snow is subcooled during the course of production of the pellets before the greatest losses occur, namely before the compression step. The desired cooling of the carbon dioxide snow is achieved by a suitable metering of the cryomedium and/or a suitable exposure time. Moreover, the compression molds can be simultaneously cooled indirectly by residual liquid cryomedium and the cooled carbon dioxide snow. Not only direct heat exchange can be used for subcooling the $CO_2$ snow, but also indirect heat exchange between the carbon dioxide snow and the cold delivering cryomedium is contemplated. This is especially relevant, according to one embodiment of the invention, wherein the $CO_2$ snow is already subcooled with the cryomedium in the supply bin for $CO_2$ snow. This embodiment can optionally be combined with the above-described spray cooling technique, for example, cooling the $CO_2$ snow by indirect heat exchange (cooling coil), where it is produced by injecting liquid $CO_2$ under pressure and cooling the $CO_2$ snow during transportation from the bin to the compression device by spraying liquid cryomedia onto.

In another advantageous modification of the process according to the invention, the compression molds are separately cooled with a cryomedium, preferably the same cryomedium used for subcooling the snow. This can be accomplished with apparatus comprising, for example, two spray heads with a common source of cryomedium, and separate conduits. A piston and a die of a ram, e.g., with bores or channels therein or thereon, can likewise be cooled with the cryomedium.

As cryomedia, liquid nitrogen and liquid argon are especially suitable for employment in the process of the invention.

During the process, there are involved intermediate compositions comprising, or consisting essentially of, or consisting of carbon dioxide snow and a cryomedium, e.g., argon and nitrogen, in varying proportions. For example, in a supply vessel for carbon dioxide snow, the amount of liquid cryomedium in the vessel is sufficient to subcool the $CO_2$ snow. Likewise, when the snow is sprayed with cryomedium, a similar composition is formed for a short time period.

In a supply vessel, the preferred weight ratio of the $CO_2$ snow to liquid cryomedium hs about 9:1 to 3:1; when the $CO_2$ snow is sprayed with cryomedium, the preferred weight ratio of the composition is also 9:1 to 3:1.

An apparatus to conduct the process of the invention comprises, for example, means for producing and intermediate storing of the cryomedium, means for spraying cryomedium onto $CO_2$ snow, a conduit for transporting cryomedium to the spraying means and/or other cooling means, compression means for compressing $CO_2$ snow, die means for forming compressed $CO_2$ snow into solid shapes, and means to form pellets from said solid shapes, the latter means being, for example, cutting and/or comminuting means.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE FIGURES

Figure 1:
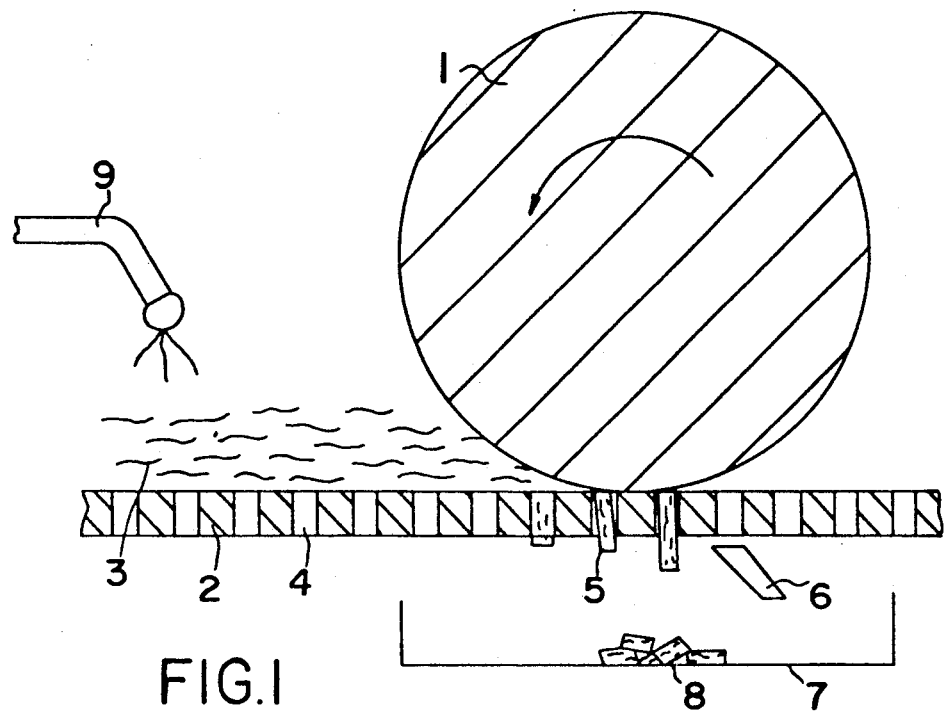
FIG. 1 represents the compression section of the plant for conducting the process according to the invention.
Figure 2:
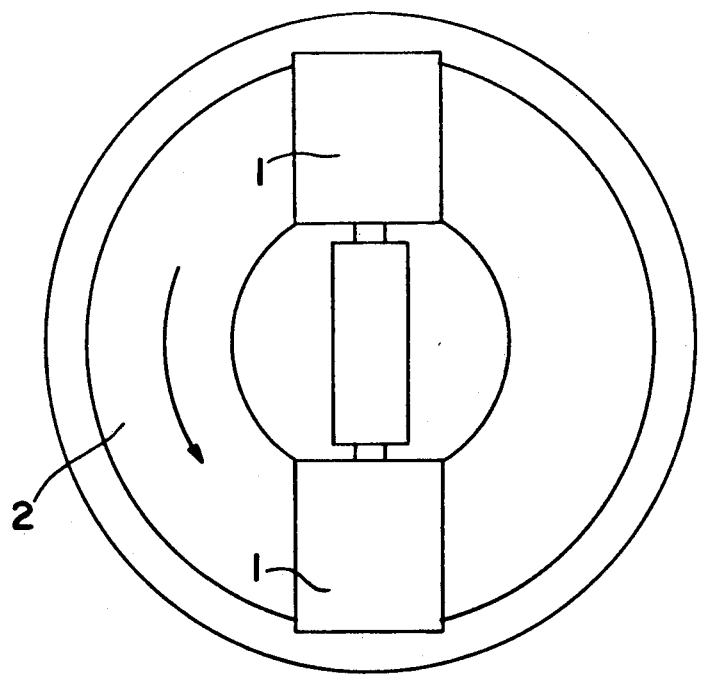
FIG. 2 represents a reduced, simplified top view of the compression section of FIG. 1.

The apparatus diagrammatically represented in the figures is a so-called flat die press. The latter comprises basically of one or more compression rollers 1 and a die 2 placed under it. Carbon dioxide snow 3 is compressed through die 2 by compression roller 1. Thus, depending on the cross section shape of holes 4 placed in the die, round or square rods 5 of the compressed solids are obtained which form rods on the other side of die 2. These compressed rods 5, are sheared off by a cutting device 6 and collected in a collecting tank 7. Depending on the objective, the resultant pellets 8 may constitute the final product or they can be size-reduced in another step. This additional step can take place, for example, in a comminuting device, in which the ground material is cooled with a cryomedium.

The carbon dioxide snow 3 to be processed, is subcooled with liquid nitrogen with a spray device 9 placed above the rotating die 2 and upstream of the compression roller 1 relative to the rotation or conveying direction. The carbon dioxide snow is thus subcooled and sublimation during the entire process is largely prevented. Thereby, the amount of nitrogen is regulated so that the carbon dioxide snow is cooled to about at least 5° below its sublimation temperature ($-78.5°$ C.), preferably to $-83.5°$ to $-108.5°$ C. or to intervening values, e.g., $-85°$ or $-95°$ C. Moreover, the amount of nitrogen can be selected so that the portions of the applied liquid nitrogen volatilize only in the compression process itself so that in this phase, evaporative cooling also occurs.

If the compression device with compression rollers 1 and die 2, shown in the figures, are disposed in a housing, which is often the case with all types of compression devices, the inside space of the entire housing as well as the compression molds are automatically and simultaneously cooled by spraying the nitrogen in the interior of the housing onto the $CO_2$ snow. This effect provides a further improvement in the efficiency of $CO_2$ pellet production.

Figure 4:
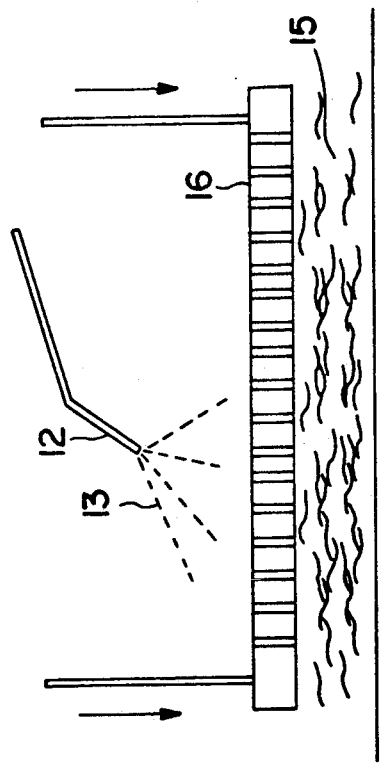
FIG. 4 is a schematic illustration of a process wherein a die is pressed onto carbon dioxide snow and the top of the die is cooled by a cryomedium.

By other means, e.g., a separate special cooling of the compression molds, the efficiency of production can be increased even more. For example, this can be accomplished by metered spraying of the dies with liquid nitrogen, e.g., by spraying the surface of the compressing roller facing away from the die or by spraying the die itself before applications of the carbon dioxide snow to be pressed. In this case, the goal is that the temperature of the molds during operation is kept at a temperature that is not substantially above the sublimation temperature of the carbon dioxide, e.g., in the range of $-60°$ C. to $-90°$ C. Furthermore, at the start of production, a temporarily increased nitrogen feed for quick cooling of the unit is recommended. FIG. 4 exemplifies this type of operation wherein a die 16 is pressed on the carbon dioxide snow 15 in order to produce carbon dioxide particles. The die 16 itself is cooled by jets of the cryomedium 13 spraying out of the nozzle 12.

Figure 3:
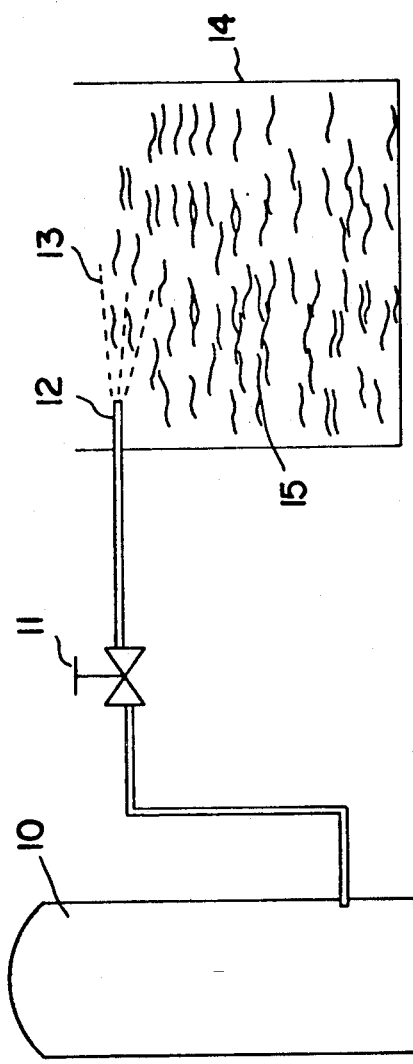
FIG. 3 is a schematic illustration showing how a cryomedium can be added to a vessel containing carbon dioxide snow.

Thus, by utilizing the process according to the invention, the yield of firm, solid $CO_2$ pellets from carbon dioxide snow is clearly increased in a economical manner. As stated previously, the carbon dioxide snow can be pre-cooled in a storage vessel before it is passed to the compression step. This is exemplified in FIG. 3, which snows a storage vessel 14 containing carbon dioxide snow 15 and a storage vessel 10 for a cryomedium 13 which is sprayed through the nozzle 12, via valve 11, onto the carbon dioxide snow inside the storage vessel.

The entire disclosures of all applications, patents and publications, cited above, and of corresponding application Federal Republic of Germany P 39 21 054.5, filed Jun. 27, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of $CO_2$ pellets comprising compressing carbon dioxide snow into a firm solid, the improvement which comprises prior to the compressing step, subcooling the carbon dioxide snow to below about $-83°$ C. with a cryomedium having a normal boiling temperature of below $-180°$ C., and comprising resultant supercooled $CO_2$ snow to form said firm solid.

2. A process according to claim 1, wherein the carbon dioxide snow is subcooled by direct heat exchange with the cryomedium while the carbon dioxide snow is being conveyed to the compressing step.

3. A process according to claim 2, wherein the carbon dioxide snow is subcooled in a storage vessel for said snow.

4. A process according to claim 2, further comprising cooling molds used for performing the compressing step, said cooling being separate from the subcooling step.

5. A process according to claim 2, wherein the cryomedium is liquid nitrogen or liquid argon.

6. A process according to claim 1, wherein the carbon dioxide snow is subcooled in a storage vessel for said snow.

7. A process according to claim 6, wherein the cryomedium is liquid nitrogen or liquid argon.

8. A process according to claim 1, further comprising cooling molds used for performing the compressing step, said cooling being separate from the subcooling step.

9. A process according to claim 3, further comprising cooling molds used for performing the compressing step, said cooling being separate from the subcooling step.

10. A process according to claim 9, wherein the cryomedium is liquid nitrogen or liquid argon.

11. A process according to claim 1, wherein the cryomedium is liquid nitrogen or liquid argon.

12. A process according to claim 1, further comprising comminuting the said firm solid into a desired particle size.

13. A process according to claim 1, wherein the subcooling occurs at a temperature range of between $-83°$ C. and $-108°$ C.

14. A process according to claim 1, wherein said subcooling of the carbon dioxide snow is conducted by spraying a liquified gas onto said snow while the carbon dioxide snow is conveyed to the compressing step.

* * * * *